US008326586B2

(12) United States Patent
Noh et al.

(10) Patent No.: US 8,326,586 B2
(45) Date of Patent: Dec. 4, 2012

(54) METHOD FOR DESIGNING GLASS ANTENNA

(75) Inventors: Yong Ho Noh, Gyeonggi-do (KR); Ho-Sung Choo, Seoul (KR); Seul-Gi Park, Seoul (KR); Seung-Beom Ahn, Seoul (KR)

(73) Assignee: Hyundai Motor Company, Seoul (KR)

( * ) Notice: Subject to any disclaimer, the term of this patent is extended or adjusted under 35 U.S.C. 154(b) by 308 days.

(21) Appl. No.: 12/570,799

(22) Filed: Sep. 30, 2009

(65) Prior Publication Data

US 2010/0094445 A1 Apr. 15, 2010

(30) Foreign Application Priority Data

Oct. 13, 2008 (KR) ........................ 10-2008-0100355

(51) Int. Cl.
*G06F 17/50* (2006.01)
*G06F 3/00* (2006.01)
*H01Q 1/32* (2006.01)

(52) U.S. Cl. ....... 703/5; 703/17; 343/713; 343/700 MS; 455/550.1

(58) Field of Classification Search ................ 703/5, 17; 343/713, 700 MS; 455/550.1
See application file for complete search history.

(56) References Cited

U.S. PATENT DOCUMENTS

| | | | | |
|---|---|---|---|---|
| 5,355,144 | A * | 10/1994 | Walton et al. | 343/713 |
| 6,396,445 | B1 * | 5/2002 | Saitoh et al. | 343/713 |
| 6,822,613 | B2 * | 11/2004 | Kubota | 343/713 |
| 7,558,555 | B2 * | 7/2009 | Nagy | 455/277.1 |
| 2006/0009251 | A1 * | 1/2006 | Noda et al. | 455/550.1 |
| 2010/0085261 | A1 * | 4/2010 | Baranski | 343/713 |

FOREIGN PATENT DOCUMENTS

| | | | |
|---|---|---|---|
| JP | 2002-340954 | A | 11/2002 |
| JP | 2007-074604 | A | 3/2007 |
| KR | 10-2004-0032157 | A | 4/2004 |
| KR | 10-2006-0100860 | A | 9/2006 |
| KR | 10-0794000 | | 1/2008 |

* cited by examiner

*Primary Examiner* — Thai Phan
(74) *Attorney, Agent, or Firm* — Edwards Wildman Palmer LLP; Peter F. Corless

(57) ABSTRACT

The present invention features a technique comprising the design of a glass antenna having a desired performance regardless of the kind of vehicle and the glass size and the shape of vehicle, by operating an EM (engineering model) simulation tool with an optimization algorithm.

14 Claims, 16 Drawing Sheets

(a)

(b)

(a)

(b)

(a)

(b)

(a)

(b)

(a)

(b)

(c)

(a)

(b)

(a)

(b)

METHOD FOR DESIGNING GLASS ANTENNA

CROSS-REFERENCE TO RELATED APPLICATION

This application claims under 35 U.S.C. §119(a) the benefit of Korean Patent Application No. 10-2008-0100355 filed Oct. 13, 2008, the entire contents of which are incorporated herein by reference.

BACKGROUND OF THE INVENTION

The present invention relates, in part, to a glass antenna design method. In particular, the present invention relates to a glass antenna design method for efficiently designing a glass antenna having a desired performance, regardless of the kind of vehicle and the glass size and the shape of vehicle, preferably by operating an EM (engineering model) simulation tool with a suitable optimization algorithm.

Generally, in a vehicle, an audio/video system is preferably installed so that a driver or a passenger is able to receive a broadcast, while an antenna for receiving a radio broadcast from an exterior transmitting station by the audio/video system of vehicle is suitably mounted.

Preferably, such an antenna includes a pole antenna which stands high from a car body, an antenna of a shark fin form which is suitably adhered to the ceiling or inside of a vehicle, and a glass antenna which is suitably printed on the glass of a vehicle. The receiving performance of the pole antenna and shark fin form antenna has been shown to be excellent. However, it has also been shown that there are considerations such as the manufacturing cost, mounting process, and contamination and malfunction during the use of vehicle. Accordingly, recently, glass antennas have become more widely used.

Regarding the glass antenna, a copper clad pattern is suitably printed on the glass of the rear of a vehicle in consideration of durability and vehicle aesthetic design. Preferably, the glass antenna can suitably form a FM, AM, and TV antenna by using a rear glass plane.

Preferably, the quality distribution of such glass antennas according to the noise input is suitably broad in the operation of electrical equipment at an AM band due to the manufacturing method of the vehicle, so that the maintenance of noise-suppression is difficult, therefore, in the case of the vehicle having a rear door among vehicles including, but not limited to for example, a sedan or RV, SUV, CUV or the like, the back door glass is not utilized. Preferably, in the case of the vehicle having a rear door among vehicles including, but not limited to for example, a sedan or RV, SUV, CUV or the like, a quarter glass surface is usually utilized to mount the FM radio and TV antenna.

However, the area of the quarter glass surface presents considerations with tuning the antenna, and the design is not suitably standardized, so that, in the case of a new vehicle model, a new antenna can preferably be designed after a final shape is formed. Accordingly, it is preferable that a new antenna pattern should be suitably designed whenever the model of a vehicle changes. Subsequently, cost and time are considerations.

Further, glass antennas of different types are preferably designed according to the operating frequency and frequency bandwidth of each broadcast in order to suitably receive not only the broadcast signal of FM radio, TV, and a satellite/terrestrial DMB (digital multimedia broadcasting), but also other types of broadcast signals.

The above information disclosed in the Background section is only for enhancement of understanding of the background of the invention and therefore it may contain information that does not form the prior art that is already known in this country to a person of ordinary skill in the art.

SUMMARY OF THE INVENTION

In preferred aspects, the present invention provides a glass antenna design method for efficiently designing a glass antenna which performs optimally regardless of the kind of vehicle, glass size and shape by using an EM simulation tool and an optimization algorithm.

Preferably, a glass antenna design method according to certain preferred aspects of the invention automatically designs a glass antenna by suitably combining an EM simulation tool with an optimization algorithm.

In preferred embodiments, a method for designing a glass antenna according to another aspect of the invention preferably includes a preparation step of suitably controlling an equivalence coding condition of a glass and a location of an antenna power feeding unit so that a simulation of a glass antenna can be suitably achieved using an EM (engineering model) simulator, changing a vehicle structure with a mesh number appropriate for applying an optimization algorithm, and suitably determining a proper initial prototype according to a kind of vehicle and glass size and shape; a performance optimization step of suitably optimizing glass antenna performance by operating the EM simulator with the optimization algorithm after the preparation step is suitably completed; and a mass production optimization step of redesign of an optimized glass antenna as a final glass antenna shape suitably applicable to mass production when the optimized glass antenna is preferably obtained after the performance optimization step is suitably completed.

In accordance with another preferred embodiment of the present invention, the preparation step preferably includes suitably adjusting the equivalence coding condition of the glass; suitably controlling the mesh number of the vehicle structure; and suitably determining the initial prototype according to the vehicle and the glass.

In accordance with another preferred embodiment of the present invention, suitably adjusting the equivalence coding condition includes preferably equalizing a strip line shape printed on the glass with a wire coding method. Preferably, controlling the mesh number includes suitably analyzing a current induced to a car body by the glass antenna. In certain preferred embodiments, the performance optimization step includes encoding and decoding the glass antenna shape of the initial prototype by suitably utilizing the EM simulator; suitably filtering a design in which the glass antenna shape or a condition is not suitable; suitably determining cost values, which in further preferred embodiments are preferred indexes indicating the performance of the glass antenna; suitably determining a Pareto-Cost value after the simulation of one generation is completed; suitably determining a convergence of the Pareto cost value; and creating a new generation and circulating to the decoding step in case the Pareto-Cost value does not converge, while preferably obtaining the optimized glass antenna in case the Pareto cost value converges. According to other certain preferred embodiments, encoding and decoding the glass antenna shape preferably comprises suitably assigning a binary bit by using a section length of the glass antenna or the existence of a strip line of mesh grid structure. Preferably, filtering a design is suitably performed by using an undesired shape filtering which is suitably applied to the glass antenna design using the section length of antenna or by preferably using a connection warranted filtering suitably applied to the glass antenna design using a mesh grid type. Preferably, the cost value sets up a suitably desired performance of the glass antenna, preferably as an average of a reflection loss of a corresponding frequency or as an average of radiation gain difference at a broadside direction (θ=90°, f=270°). In preferred embodiments, the optimization algorithm is one selected from, but not limited to, a gene algorithm, a pareto gene algorithm, a micro gene algorithm, PSON (Particle Swarm Optimization), Newton-Raphson, and a neural algorithm. Preferably, a vehicle power feeding unit and a glass power feeding unit are suitably connected through a wire which is suitably extended with a given length in a vertical direction respectively for the simulation of the EM simulator. In further embodiments, the performance optimization step preferably includes designating a plurality of computers as a master computer and a slave computer and suitably connecting them in parallel, such that time required for the creation of one generation can be suitably shortened, so as to reduce the time of glass antenna design optimization using the EM simulation tool. Preferably, the mass production optimization step includes suitably obtaining a final glass antenna by using an antenna shape simplification technique so as to suitably simplify the optimized glass antenna as a shape which is suitably applicable to mass production. In preferred embodiments of the present invention, obtaining a final glass antenna comprises suitably redesigning the final glass antenna as an antenna shape which is suitably applicable to mass production by removing a strip line. In certain cases, the optimized antenna shape is complex and a strip line may exist in a location which cannot be suitably applied in mass production, for example by using a current based antenna shape simplification technique which suitably simplifies a shape of the optimized glass antenna based on the amount of current. Preferably, the current amount based antenna shape simplification technique suitably simplifies a shape of glass antenna by analyzing the density of the current which flows in a conductive strip line of glass antenna structure for each frequency by using the simulation tool, and preferably removing the strip line in which the current amount flows less than a certain degree. Preferably, obtaining a final glass antenna, suitably redesigning the final glass antenna as an antenna shape which is suitably applicable to mass production by using a control technique of strip line width and length by analyzing a principle of operation according to the shape of each antenna, when the control technique of strip line width and length keeps the width of a major strip line to maintain a given thickness in case the major strip line affects antenna performance over a given degree, while suitably keeping a width of a strip line to be thin in case the strip line affects antenna performance less than a given degree.

In preferred embodiments, the present invention describes the efficient design of a glass antenna which has a suitably optimal performance regardless of the kind of vehicle, glass size and shape by using an EM simulation tool with an optimization algorithm. Further, the present invention has an effect of building a design technique which can preferably be directly applied in an industrial site since it can be suitably optimized as an antenna shape which can be suitably applied for mass production, preferably by using an antenna shape simplification technique. Further, the present invention can suitably optimize an antenna by differentiating an initial prototype according to a glass such that it can suitably design a form which satisfies an arbitrary limit condition and further it can be suitably applied to a glass antenna design for various broadcasts and communications.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

Figure 1:
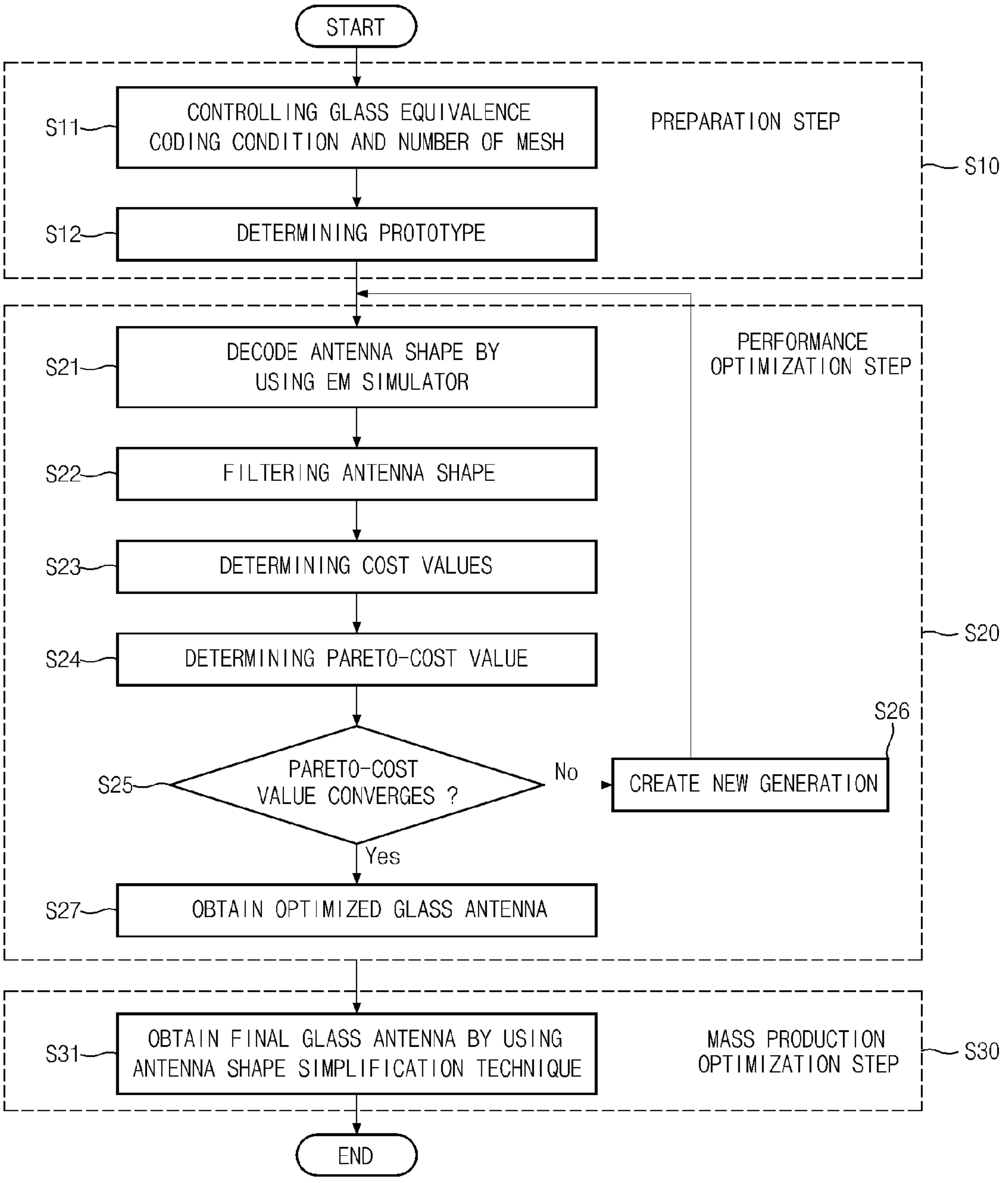
FIG. 1 is a flowchart showing a preferred glass antenna design method of the invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE EMBODIMENTS

In one aspect, the present invention features a method for designing a glass antenna comprising combining an EM simulation tool with an optimization algorithm.

In another aspect, the present invention features a method for designing a glass antenna, the method comprising a preparation step, a performance optimization step, and a mass production optimization step.

In one embodiment, the preparation step comprises controlling an equivalence coding condition of a glass and a location of an antenna power feeding unit.

In another embodiment, the equivalence coding condition of a glass and the location of an antenna power feeding unit are controlled so that a simulation of a glass antenna can be possible through an EM (engineering model) simulator.

In a further embodiment, the preparation step further comprises, changing a vehicle structure with a mesh number appropriate for applying an optimization algorithm.

In still another embodiment, the preparation step further comprises determining a proper initial prototype according to a kind of vehicle and glass size and shape.

In another particular embodiment, the performance optimization step comprises optimizing a glass antenna performance by operating the EM simulator with the optimization algorithm after the preparation step is completed.

In a further related embodiment, the mass production optimization step comprises redesigning an optimized glass antenna as a final glass antenna shape applicable to a mass production.

In another particular embodiment, the glass antenna is obtained after the performance optimization step is completed.

Hereinafter, exemplary embodiments of the present invention will be described in detail with reference to the attached drawings However, it should be clearly understood that many variations and modifications of the embodiments described herein and which may appear to those skilled in the present art are within the spirit and scope of the present invention. The same reference numbers are used throughout the drawings to refer to the same or like parts.

According to preferred embodiments, the present invention shows a preferred glass antenna design method using an EM (engineering model) simulation tool and a suitable optimization algorithm. Preferably, in certain exemplary embodiments, a glass antenna optimized for each vehicle model can be suitably designed in a short time. In further preferred embodiments, the present invention can be suitably applied to other applications, including, but not limited to, AM/FM band, and satellite/terrestrial DMB (digital multimedia broadcasting), and analog TV or the like.

FIG. 1 is a flowchart showing an exemplary preferred glass antenna design method of the invention.

According to certain preferred embodiments and referring for example to FIG. 1, the glass antenna design method is preferably classified into a preparation step (S10) for suitably designing a glass antenna, a glass antenna performance optimization step (S20) using an optimization algorithm and a glass antenna mass production optimization step (S30) using an optimized glass antenna. Preferably, in the preparation step (S10), in the structure of a vehicle, the equivalence coding condition of a glass and the location of an antenna power feeding unit are suitably controlled, and the number of mesh appropriate for applying the optimization algorithm is preferably controlled in such a manner that the antenna can be suitably optimized by using an EM simulation. (S11).

In further preferred embodiments, a proper initial prototype is suitably determined according to the kind of vehicle, and the size and shape of glass (S12). Accordingly, in further preferred embodiments, after a basic establishment necessary for an antenna design is finished in the preparation step (S10), a proper prototype is suitably determined in consideration of the kind of vehicle, the size and shape of glass and an operating frequency or the like. According to further related embodiments, it is preferably advantageous for an antenna prototype to have a shape which can be suitably used for mass production that is preferably due to a simple antenna shape, while preferably using the glass efficiently.

In further preferred embodiments of the invention, in the performance optimization step (S20), the antenna shape of an initial prototype suitably determined in the preparation step is encoded and decoded by utilizing the EM simulator (S21). Preferably, when the glass antenna shape or condition of a design is not suitable, the design is filtered (S22). Accordingly, cost values which are suitable indexes showing the performance of an antenna are determined (S23). Preferably, after the simulation of one generation is completed, a Pareto-Cost value is suitably determined (S24), and in further embodiments, according to whether the Pareto-Cost value converges or not (S25), a new generation is suitably created (S26) or an optimized glass antenna is obtained (S27).

According to further embodiments of the invention, in the creation or a new generation, a crossover and a mutation which are the preferred principles of gene algorithms are suitably applied. Preferably, the newly created generation suitably circulates back to the decoding process (S21) which utilizes the EM simulator.

Preferably, in the mass production optimization step (S30), the final glass antenna is suitably obtained by using the antenna shape simplification technique in order to suitably simplify the optimized glass antenna as a shape with which mass production is actually possible (S31). In further preferred embodiments, after the preparation step is suitably completed, the present invention optimizes the antenna capacity by using the gene algorithm.

Preferably, the antenna performance optimization can be broadly divided into an EM simulation encoding and decoding, filtering, cost determination, and creation of a new generation. Preferably, when the optimized glass antenna is suitably provided after the antenna performance optimization is completed, it is suitably redesigned as an antenna shape which is actually applicable to mass production through an antenna mass production optimization procedure. Preferably, the antenna mass production optimization uses an antenna shape simplification technique, and preferably uses a control technique of strip line width and length of glass.

In other further preferred embodiments of the invention, the antenna shape simplification technique suitably simplifies the shape of glass antenna based on a amount of current, particularly in the case when the optimized antenna shape is complex, so that there is a consideration in the appearance, or in the case that the strip line exists in a location which cannot suitably be applied in mass production.

In particular preferred embodiments, the amount of current based shape simplification technique suitably analyzes the density of a current which flows in a conductive strip line of an antenna structure for each frequency, preferably by using a simulation tool. According to preferred exemplary embodiments of the invention, the strip line in which the amount of current flow suitably less than a given amount is removed to simplify the glass antenna shape. Accordingly, according to certain preferred embodiments, through this technique, the glass antenna which will be preferably used in mass production is optimally designed in antenna performance side, and according to further preferred embodiments, the shape of glass antenna is suitably simple, and accordingly, in certain preferred exemplary embodiments, it can have an advantage in terms of design.

According to further preferred embodiments of the present invention, after analyzing the principles of operation according to the shape of each antenna, the control technique of strip line width and length suitably keeps the width of a major strip line which may considerably affect antenna performance to maintain a given thickness. In further related embodiments, the control technique as described herein maintains the width of a strip line, which may suitably affect antenna performance less. Further, in preferred embodiments the present invention provides that disadvantages which may follow when the length of each antenna is suitably changed to improve the performance of a specific frequency band, or it are suitably applied for mass production, can preferably be removed.

According to certain preferred embodiments of the invention, for example in the case of a glass antenna for receiving a FM broadcast, the glass antenna design method using the EM simulation tool and optimization algorithm can preferably check the shape and antenna performance of a glass antenna of mufti-loop type suitably optimized by using the antenna length and a glass antenna of Mesh-grid type optimized by using each strip line.

Preferably, both the two antenna types have a suitable gain higher than −20 dBi at all corresponding frequencies, and the simulation result which utilized the EM simulator and the measurement result obtained in an actual vehicle are suitably very similar. Preferably, the current amount based shape simplification technique is suitably applied in the case of a glass antenna of Mesh-grid type, so that the gain is suitably similar in the FM frequency band. In further embodiments, the antenna shape becomes suitably simplified in comparison with the optimized shape such that it can be suitably implemented to be applicable in mass production.

In other preferred embodiments of the invention, the actual glass antenna is preferably formed with a 3 mm thick glass and a 1 mm thick printed strip line. Further, in order to suitably solve a numerical error which may be generated in certain examples when applying the EM simulator, is the glass is equalized with a suitable form in which a wire made of copper exists in the inside of the glass, preferably by a wire coding method. Preferably, a condition such as the radius of a wire, dielectric constant and dielectric loss is suitably controlled by comparing the glass antenna measurement result with the simulation result.

Figure 2:
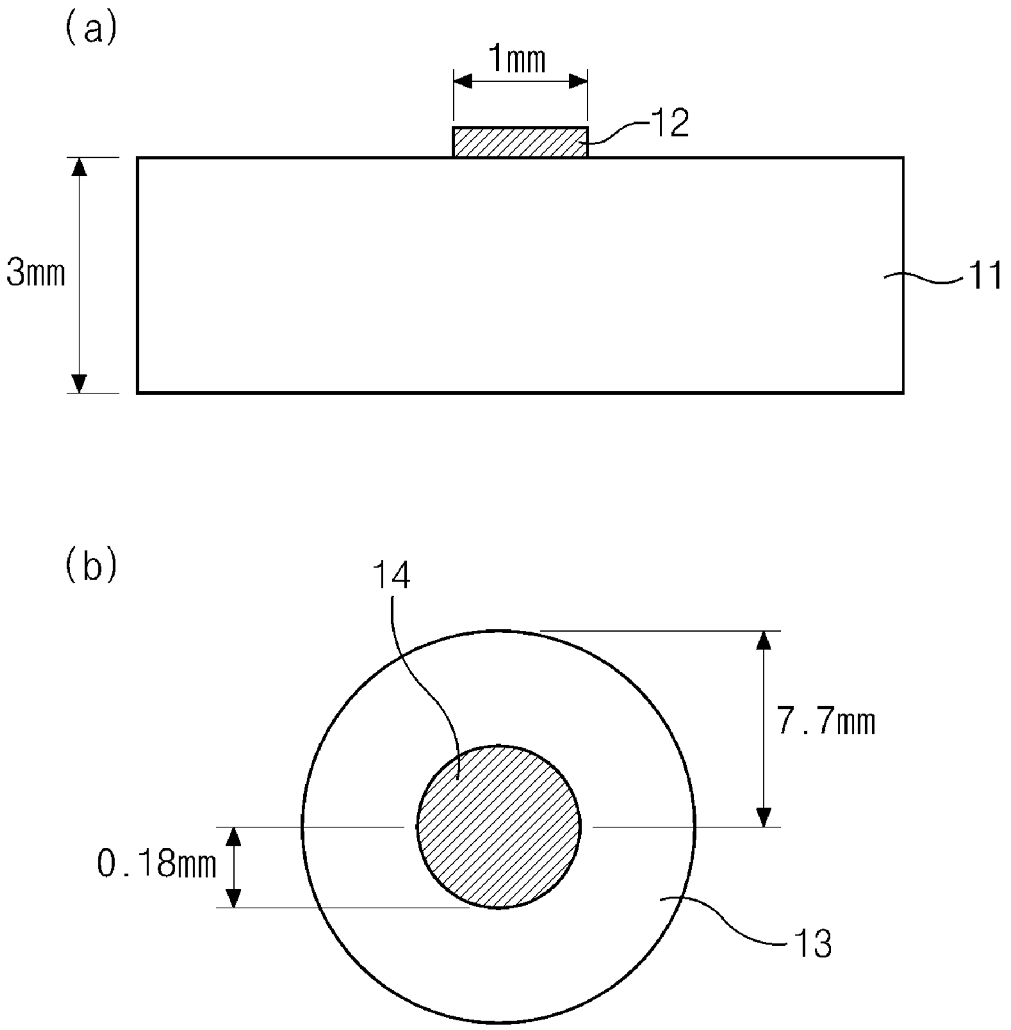
FIGS. 2(*a*) and (*b*) are conceptual diagrams showing an equivalence coding condition in a preferred glass antenna design method of the invention.

According to certain embodiments of the invention and as shown in FIG. 2, FIG. 2 is a conceptual diagram showing a preferred equivalence coding condition in a preferred glass antenna design method of the invention.

According to certain preferred embodiments, here, (a) is a conceptual diagram showing an actual glass antenna. Preferably, the actual glass antenna makes a suitable antenna shape by using a glass 11 of 3 mm thickness and a 1 mm printed copper wire 12. According to other further preferred embodiments, (b) is a conceptual diagram made equivalent in order to suitably apply the glass antenna to the EM simulator as a shape in which a glass 13 of radius 7.7 mm suitably surrounds a wire 14 made of copper having a radius 0.18 mm.

In certain preferred embodiments, as to the glass antenna design, when an antenna which is preferably designed optimally in view of the performance of antenna without considering an actual vehicle, and is then mounted on the actual vehicle, the performance of antenna changes such that the result prediction becomes suitably difficult. According to preferred embodiments, for solving such problems, by considering not only the glass antenna but also the vehicle structure to suitably design an antenna, an antenna is preferably designed according to a situation which is suitably similar to the actual condition of a vehicle.

In preferred embodiments of the invention, in order to shorten the time for interpretation of the antenna including a vehicle, the current induced in a car body by the antenna is suitably analyzed and the vehicle mesh number is suitably controlled. In further embodiments, the glass which is preferably diagonally placed is calculated as a rate of change over the vehicle height such that the coordinate of the glass antenna is suitably simplified.

Figure 3:
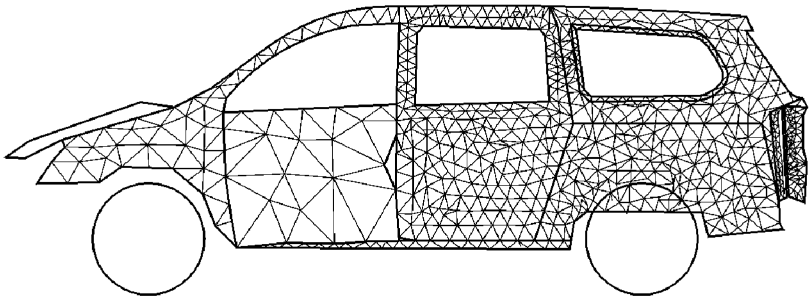
FIGS. 3(*a*) and (*b*) are conceptual diagrams showing a vehicle mesh number in a preferred glass antenna design method of the invention.
Figure 3:
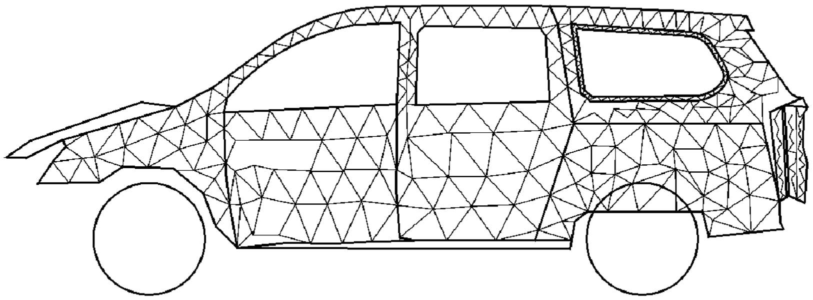

According to further embodiments of the invention and as shown in FIG. 3, FIG. 3 is a conceptual diagram showing a vehicle mesh number in a preferred glass antenna design method of the present invention.

Preferably, and as shown here, in 100 MHz which is a suitable FM frequency band, the current distribution suitably induced by an antenna into a car body is shown. As described herein, many currents are suitably induced around a glass antenna while a relatively small current is suitably induced in the car body which is far from the glass antenna. Preferably, the mesh number applicable to the optimization algorithm is determined by suitably reducing the mesh number of a part in which a current is minutely induced and by suitably increasing the mesh number of a part in which many currents are induced.

According to certain preferred embodiments of the invention and as shown in FIG. 3 (*a*), in a vehicle shape before suitably reducing the mesh number, about 7600 meshes are suitably generated. Preferably, the mesh number as illustrated in FIG. 3 (*b*) can be suitably reduced by using the current distribution induced in the vehicle, so that a vehicle shape in which about 3300 meshes are generated can be suitably implemented.

Figure 4:
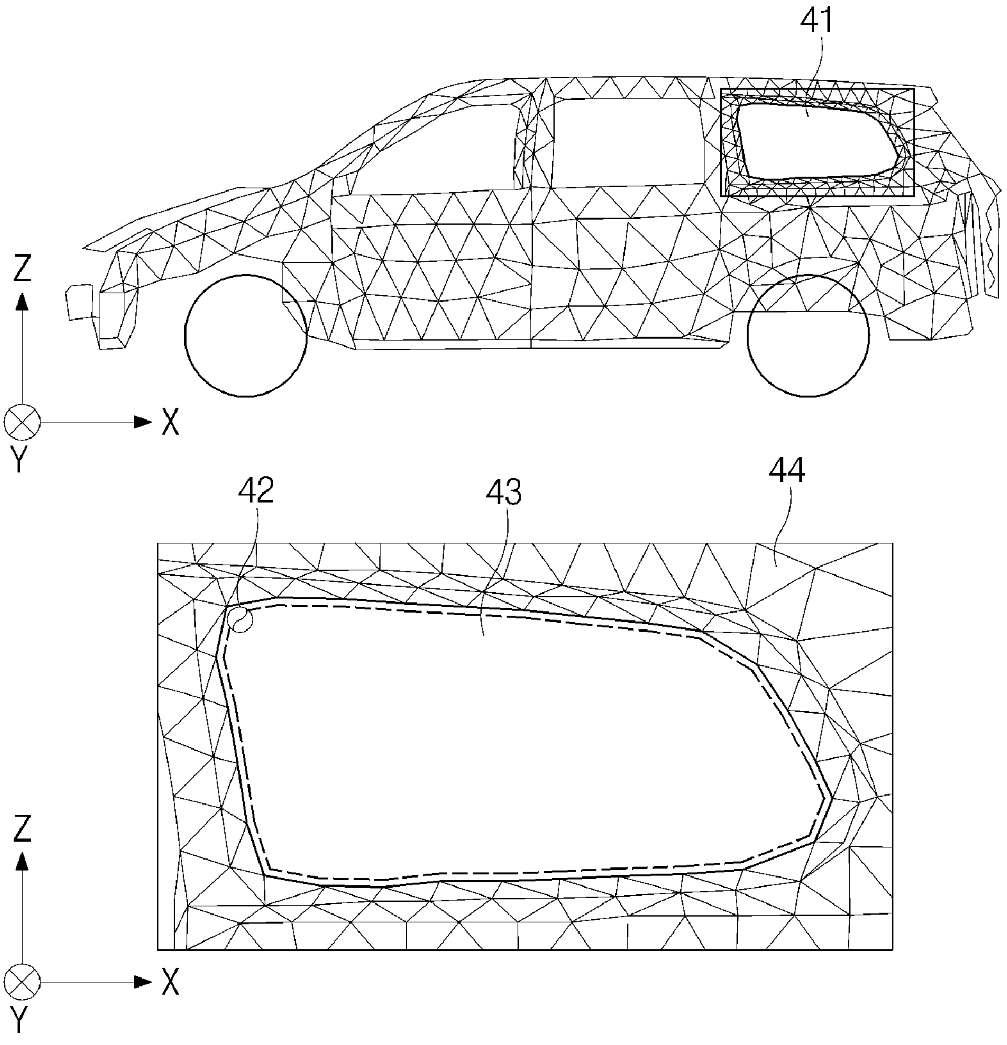
FIG. 4 is an example showing (a) a vehicle structure, (b) a glass shape in a preferred glass antenna design method, being a side view of a direction in which a glass antenna is adhered.

According to certain preferred embodiments of the invention and as shown in FIG. 4, FIG. 4 is an example showing (a) a preferred vehicle structure, (b) a preferred glass shape in a glass antenna design method, being a side view of a direction in which a glass antenna is suitably adhered.

Preferably, here, (a) shows the structure of a vehicle, and (b) shows a glass shape. A power feeding 42 is performed in a left upper end of a glass 41 while the glass 41 of a car body 44 is positioned behind a driver's seat. Preferably, a glass antenna of desired performance is suitably designed by appropriately using a space 43 capable of suitably expressing an antenna shape through an EM simulator and a suitable optimization algorithm.

According to certain preferred embodiments of the invention, in a power feeding unit of an actual vehicle, a vehicle power feeding unit and an amplifier are suitably connected, while the amplifier is preferably connected to a glass power feeding unit. Preferably, in order to apply this to the simulation, a cable comes out perpendicularly from the vehicle power feeding unit and the glass power feeding unit to be connected without the amplifier. Preferably, a reflection loss which is suitably measured in an actual vehicle and a simulation reflection loss are similar.

Figure 5:
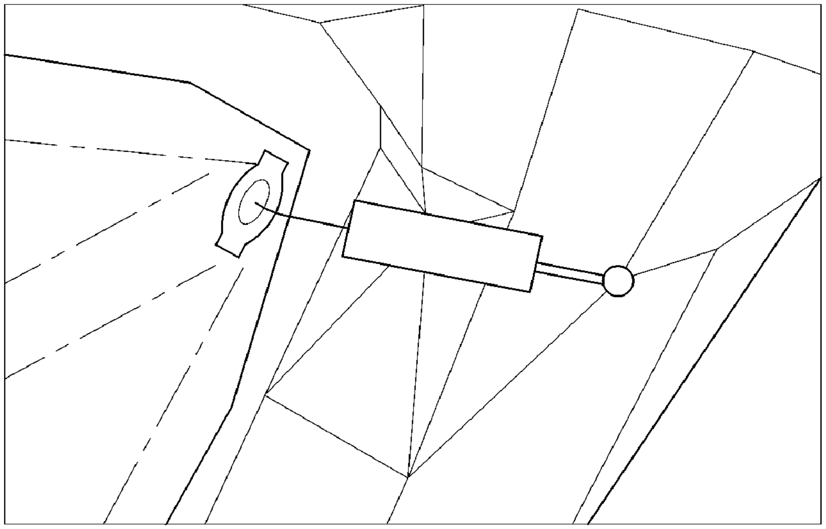
FIGS. 5(*a*) and (5) are conceptual diagrams showing a connection of a vehicle with an antenna power feeding unit in a preferred glass antenna design method of the invention.
Figure 5:
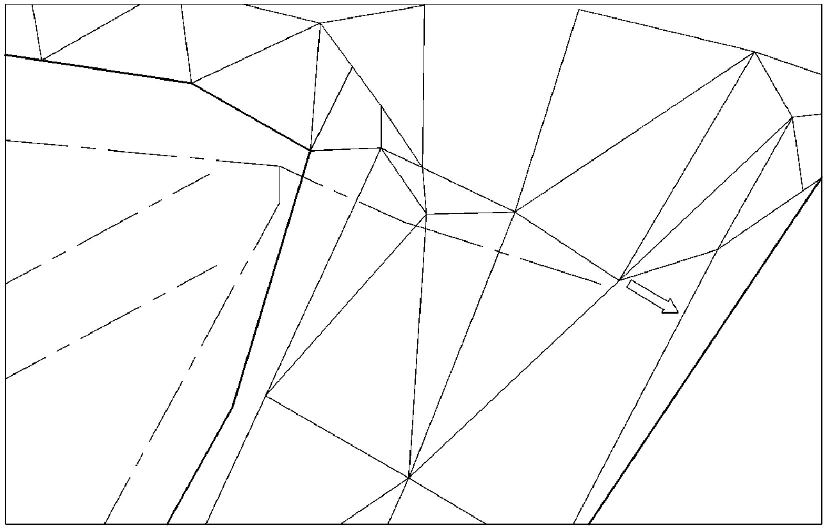

According to preferred embodiments of the invention, FIG. 5 is a conceptual diagram showing a suitable connection of a vehicle with an antenna power feeding unit in a preferred glass antenna design method of the invention.

Preferably, and as shown here, (a) shows the shape of a power feeding unit of an actual vehicle, and (b) shows the shape of an antenna power feeding unit for applying to an EM simulator. According to certain preferred embodiments, and referring to FIG. 5 (*a*), in the power feeding unit of the actual vehicle, an amplifier for the suitable application of an active circuit is connected between the vehicle power feeding unit and the glass power feeding unit, while each power feeding unit and the amplifier are connected by a cable to be fixed to a car body.

According to other preferred embodiments of the invention, and referring to FIG. 5 (*b*), in the power feeding unit which is suitably simplified to be applied to the EM simulator, the vehicle power feeding unit and the antenna power feeding unit are preferably positioned like the actual vehicle position, and two power feeding units are suitably connected by a wire to preferably the amplifier. Moreover, the vehicle power feeding unit and the antenna power feeding unit are preferably not connected with a straight line, but suitably connected through a wire which is perpendicularly extended over a given length in each power feeding unit, so that a mismatch generated in both power feeding units is suitably minimized. In preferred embodiments, in the glass antenna design method of the invention, the optimization algorithm and the EM simulator have to be operated suitably together for the antenna performance optimization.

Preferably, the optimization algorithm includes a gene algorithm, a Pareto gene algorithm, a micro gene algorithm, PSON (Particle Swarm Optimization), Newton-Raphson, and a neural algorithm. According to further preferred embodiments, the optimization algorithm is suitably implemented by using Fortran, C, C++, and MATLAB or the like, and EM interprets by suitably utilizing the EM simulator such as FEKO, IE3D, HFSS, and a microwave studio or the like.

For example, according to further preferred embodiments of the present invention, for example in the case of the implementation of the optimization algorithm by using FEKO, firstly, the preparation of a vehicle is suitably completed by using the CAD FEKO to generate a *.cfm file, and programs for an initial prototype using the EDIT FEKO by suitably inserting the *.cfm file. According to further embodiments, the initially programmed *.pre file is suitably applied to the gene algorithm and the Pareto gene algorithm is suitably implemented by Fortran to optimize the antenna.

Figure 6:
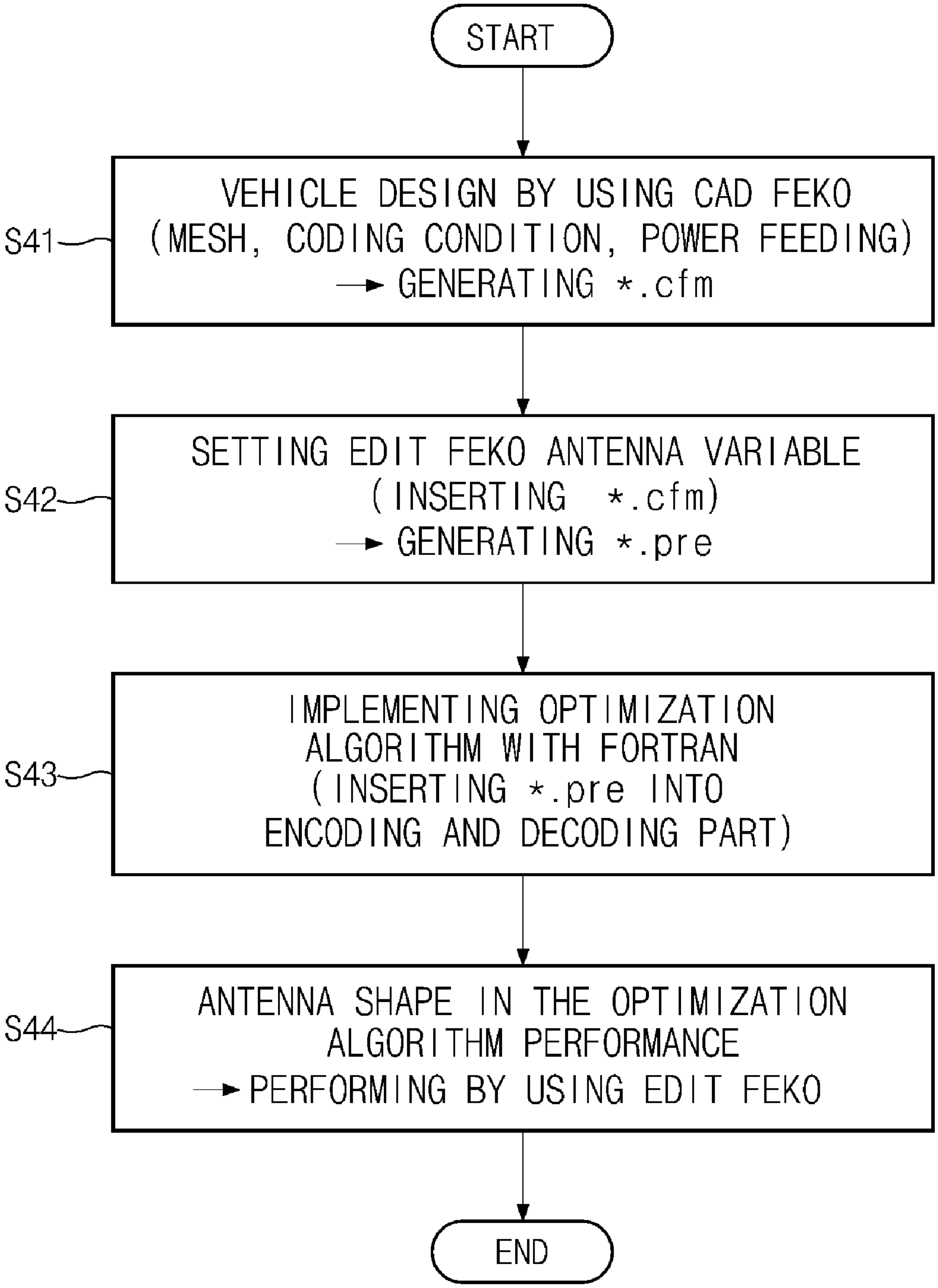
FIG. 6 is a flowchart showing the coupling of a gene algorithm with an EM simulator in a preferred glass antenna design method of the invention.

According to other further embodiments of the invention, and as shown in FIG. 6, FIG. 6 is a flowchart showing the coupling of a gene algorithm with an EM simulator according to a preferred glass antenna design method of the invention.

According to preferred embodiments, the process of optimizing an antenna by utilizing the FEKO simulator is exemplified. Firstly, by using the CAD FEKO, a task including the vehicle mesh number adjustment which is preparation work, the equivalence coding condition check, and the power feeding unit assignment is suitably performed to generate the *.cfm file (S41).

In further preferred embodiments, the *.cfm file is suitably inserted to work the initial antenna shape in the EDIT FEKO, such that the *.pre file is generated (S42). Preferably, the *.pre file is inserted into an encoding and decoding part to implement the optimization algorithm with Fortran (S43), so that the antenna optimization is suitably performed by using the antenna shape EDIT FEKO in the optimization algorithm performance (S44).

In other preferred embodiments, the encoding and decoding is suitably performed so as to be applied to the EM simulation tool after suitably determining the initial prototype, and by using it for the gene algorithm, and the performance of the antenna is optimized. Preferably, the method for decoding the antenna shape suitably includes a method which uses a length of antenna and in further particular embodiments includes a method which uses a grid form and assigns it a binary bit by using a length of the section and an existing of strip line.

Figure 7:
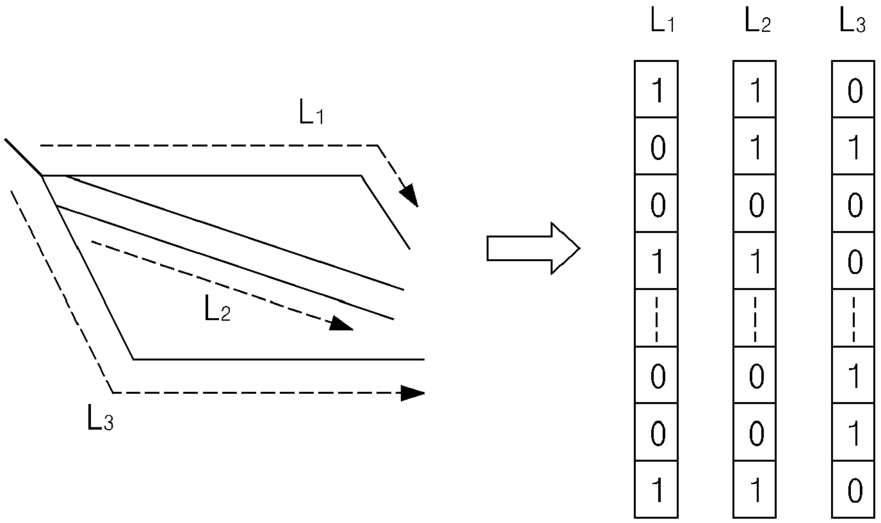
FIGS. 7(*a*) and (*b*) are conceptual diagrams showing a glass antenna encoding and decoding technique in a preferred glass antenna design method of the invention.
Figure 7:
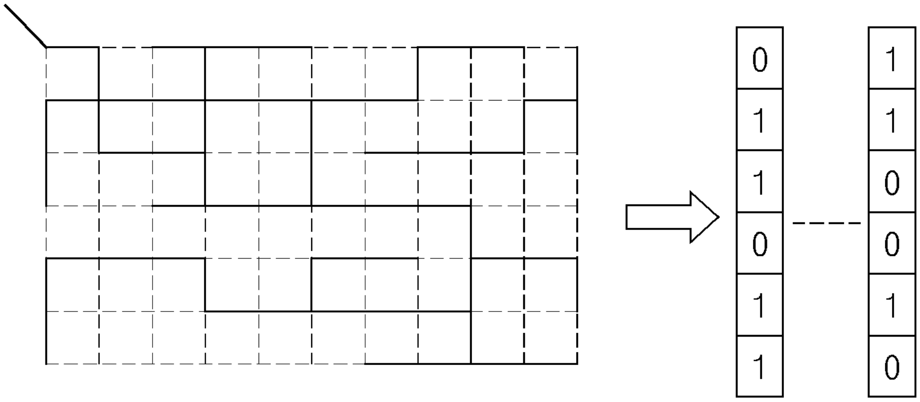

According to other preferred embodiments of the invention and as shown in FIG. 7, FIG. 7 is a conceptual diagram showing a preferred glass antenna encoding and decoding technique according to a preferred glass antenna design method of the present invention.

According to preferred exemplary embodiments and as shown in FIG. 7, (a) shows the preferred method of using an antenna length, and (b) shows the preferred method of using a suitable grid form. According to other further embodiments and referring to FIG. 7 (*a*), the method of using an antenna length is a method which preferably sets up a minimum length and a maximum length of the antenna which can be suitably designed and assigns the section with a binary bit. According to other further embodiments and referring to FIG. 7 (*b*), the method of the encoding and decoding technique using a grid form is a method which is suitably applied in a glass antenna of a Mesh-grid type form, which preferably determines a whole Mesh-grid structure where the strip line can exist, and classifies into '1' or '0' according to the existing strip line.

Preferably, while applying the encoded and decoded EM simulation programming to the gene algorithm, a non-suitable shape in view of the structure is excluded from the EM interpretation through filtering. According to further preferred embodiments, the filtering method which can be suitably applied at this time includes an undesired shape filtering and a connection warranted filtering. Preferably, the undesired shape filtering is applied to the antenna design using the length of antenna, while the connection warranted filtering is applied to the antenna implementation using a grid form.

Figure 8:
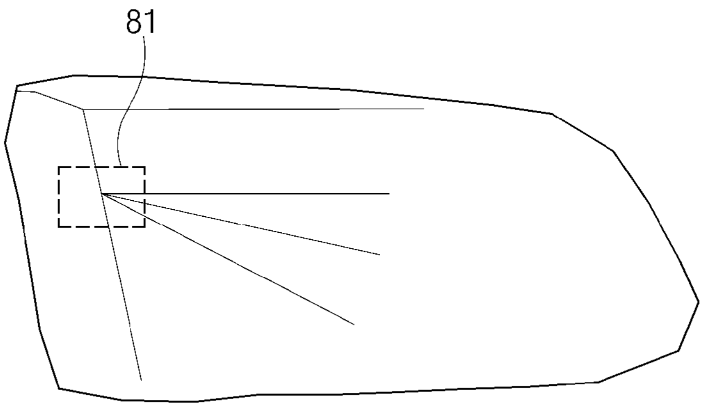
FIGS. 8(*a*), (*b*), and (*c*) are conceptual diagrams showing a filtering method of a glass antenna in a preferred glass antenna design method of the invention.
Figure 8:
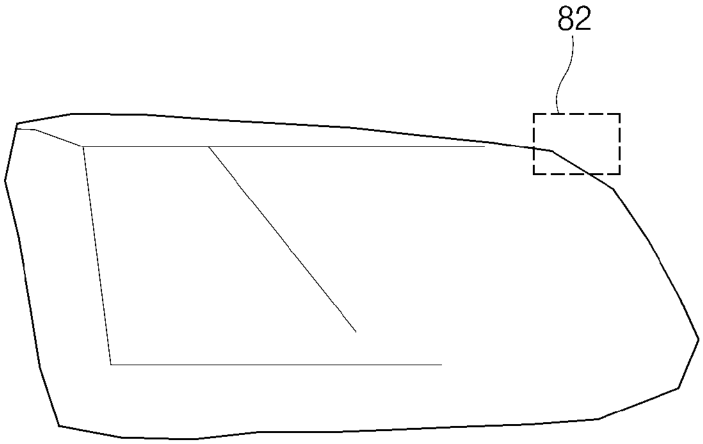
Figure 8:
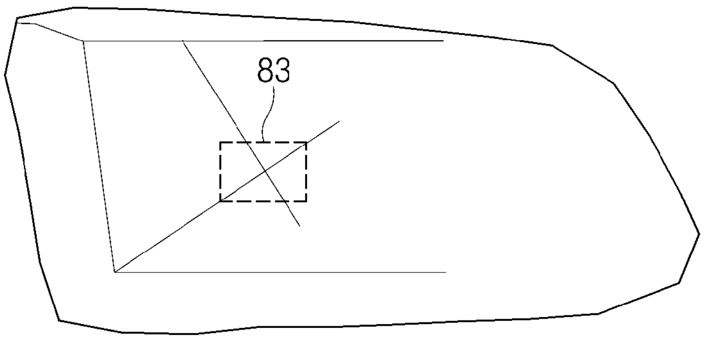

According to other further embodiments and as shown in FIG. 8, FIG. 8 is a conceptual diagram showing a suitable filtering method of a glass antenna in a preferred glass antenna design method of the invention.

According to particular exemplary embodiments and as shown here, (a) shows the case where many strip lines are initiated in the same point 81 to be filtered, (b) shows the case where strip lines are filtered in excess of the size 82 of a glass, and (c) shows the case where strip lines are filtered and being suitably overlapped inside of a glass 83.

Figure 9:
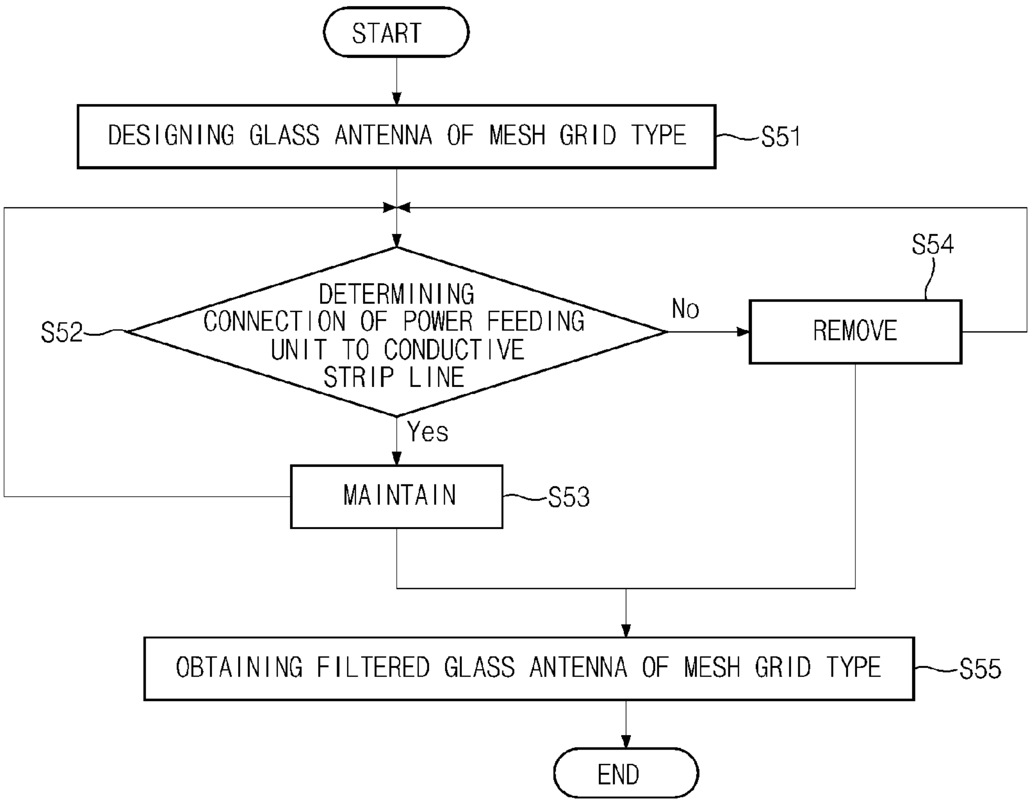
FIG. 9 is a flowchart showing a connection warranted filtering of a preferred glass antenna for a vehicle in a glass antenna design method of the invention.

According to other further embodiments and as shown in FIG. 9, FIG. 9 is a flowchart showing a suitable connection warranted filtering of a glass antenna for a vehicle in a preferred glass antenna design method of the invention.

Preferably, as to the connection warranted filtering, in a glass antenna design (S51), a conductive strip line which is not connected to a power feeding unit is suitably determined (S52) and it is maintained in case of being connected to the feeding unit (S53) while being deleted in case of not being connected to the feeding unit (S54). In further embodiments, by repeatedly applying the above process to all glasses, a filtered glass antenna can be suitably obtained (S55). In other further embodiments, by applying the above process to a decoding part of the design process, the antenna shape can be suitably simplified, and more efficient optimization is possible.

Figure 10:
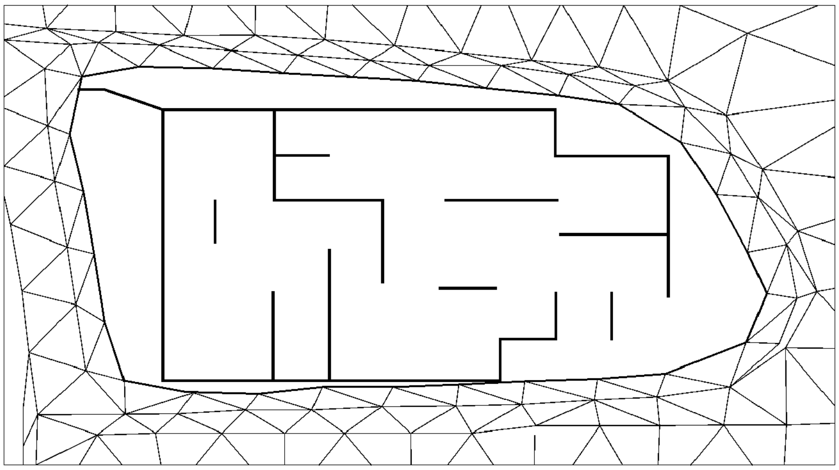
FIGS. 10(*a*) and (*b*) are conceptual diagrams showing an example of applying a connection warranted filtering of a preferred glass antenna in a glass antenna design method of the invention.
Figure 10:
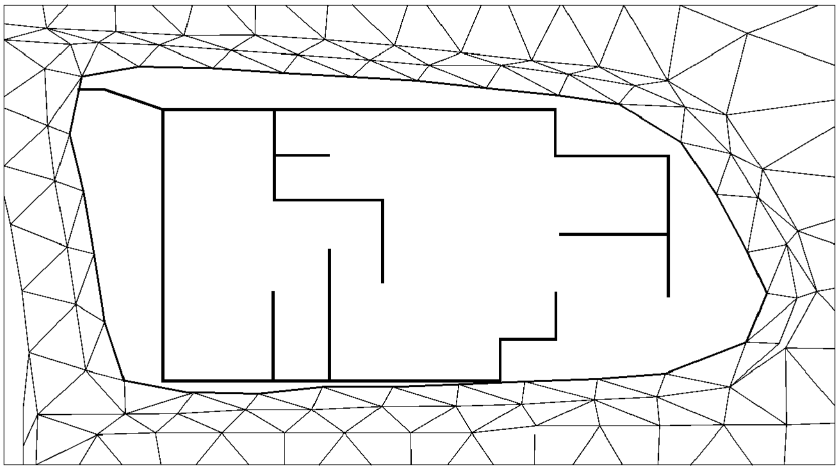

According to other further embodiments and as shown in FIG. 10, FIG. 10 is a conceptual diagram showing an example of applying a suitable connection warranted filtering of a glass antenna in a preferred glass antenna design method of the invention. According to certain exemplary embodiments, for example as shown in (a) and (b), (a) shows a glass antenna shape before applying a suitable connection warranted filtering and (b) shows a glass antenna shape where four width strip lines and length strip lines are deleted. Accordingly, the desired antenna performance is preferably set as cost while each cost value is suitably calculated as Pareto cost to perform an optimization. According to preferred embodiments of the invention, there are various cost values used in the glass antenna optimization design. In certain preferred embodiments, generally, Pareto cost is suitably applied with two cost values or a single cost value is utilized to perform an optimization.

$$\begin{cases} cost1 = \frac{1}{N}\sum_{i=1}^{N} S_{11}(f_i) \\ cost2 = \frac{i}{N}\sum_{i=1}^{N} \{G(\theta = 90°, Ø = 270°, f_i) + Dev(G)_{Ø=0\sim270°}\} \end{cases} \quad \text{[Equation 1]}$$

In certain exemplary embodiments and referring to [Equation 1], in the case of using Pareto cost, cost1 is an average of S11 which is a reflection loss at a corresponding frequency while cost2 is an average of gain difference between a gain of broadside direction (θ=90°, f=270°) of glass antenna and a gain of other angle. Preferably, by using two costs, the antenna can be optimized by using an antenna impedance match and a radiation gain simultaneously. In certain cases, it may require a long time for the optimization when considered in comparison with utilizing a single cost.

In certain embodiments, in an actual glass antenna, a shape having a high gain at broadside direction also has an excellent impedance match, such that it may be acceptable that impedance is suitably excluded from the cost value, and accordingly a unique gene algorithm using a gain cost value is preferably used. Thus, in certain preferred embodiments of the present invention, a single cost optimization, as exemplified in [Equation 2] can be used.

$$\text{cost} = \frac{i}{N}\sum_{i=1}^{N} \{G(\theta = 90°, Ø = 270°, f_i)\} \quad \text{[Equation 2]}$$

$$\text{cost} = \text{Min}G\{(\theta = 90°, Ø = 270°, f)\}$$

Preferably, in the case of the single cost of [Equation 2], an average of broadside direction gain at a corresponding frequency can be suitably used and a Min-Max method which maximizes the least gain value can be used. Further, after the simulation of one generation is suitably completed, by determining the Pareto cost value or the cost value, a new generation can be created or an optimized glass antenna can be obtained according to a convergence. According to related embodiments, the crossover and the mutation which are principles of a gene algorithm are suitably applied in the creation of a new generation, while the newly created generation suitably circulates to the encoding and decoding process using the EM simulator.

Figure 11:
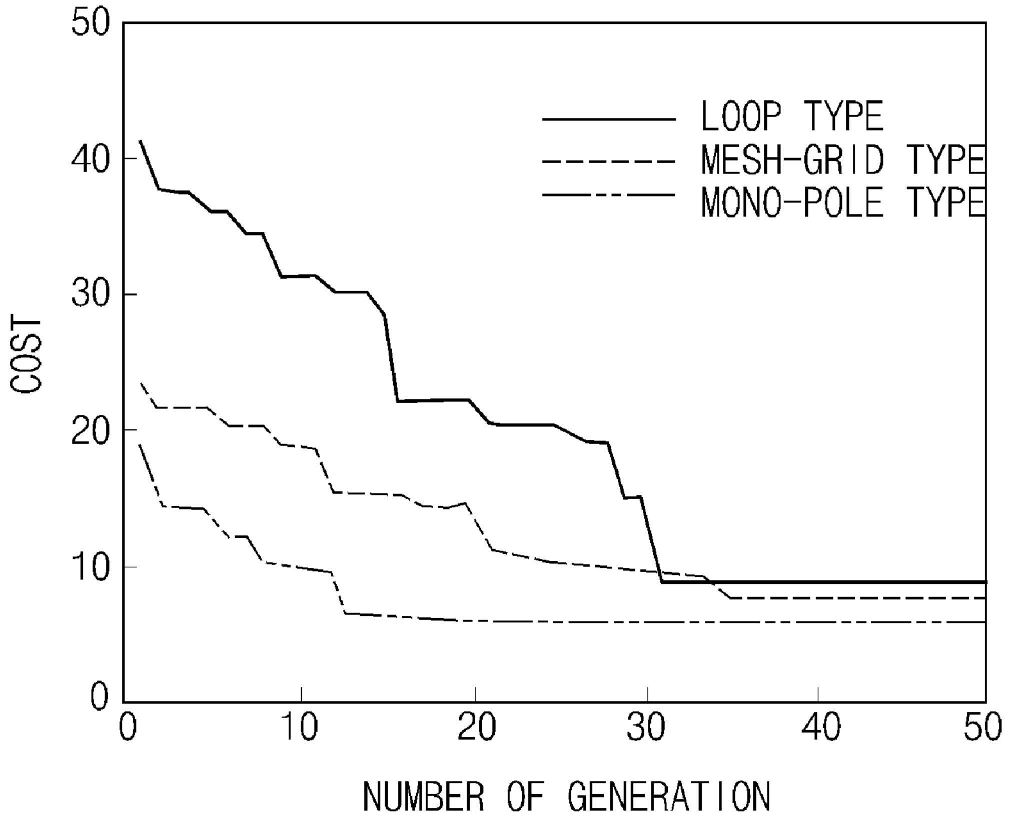
FIG. 11 is a graph showing an example of a generational cost value change in an optimization design process of a preferred glass antenna design method of the invention.

According to other further embodiments and as shown in FIG. 11, FIG. 11 is a graph showing an example of a generational cost value change in a preferred optimization design process of a glass antenna design method of the invention.

According to further exemplary embodiments, the solid line shows an antenna which has a loop type, the dotted line shows an antenna which has a Mesh-grid type and the two point rule shows an antenna which has a mono-pole type. Preferably, the cost value of all of the three kinds of antenna converges less than a given value through the generation creation more than 40 times, the antenna of mono-pole type most rapidly converges into a given value. Preferably, the cost value indicates a value obtained by multiplying a minimum value among radiation gain values at a glass antenna broadside direction (θ=90°, f=270°) by (−), while the minimum radiation gain value is suitably reduced as the optimization proceeds.

Figure 12:
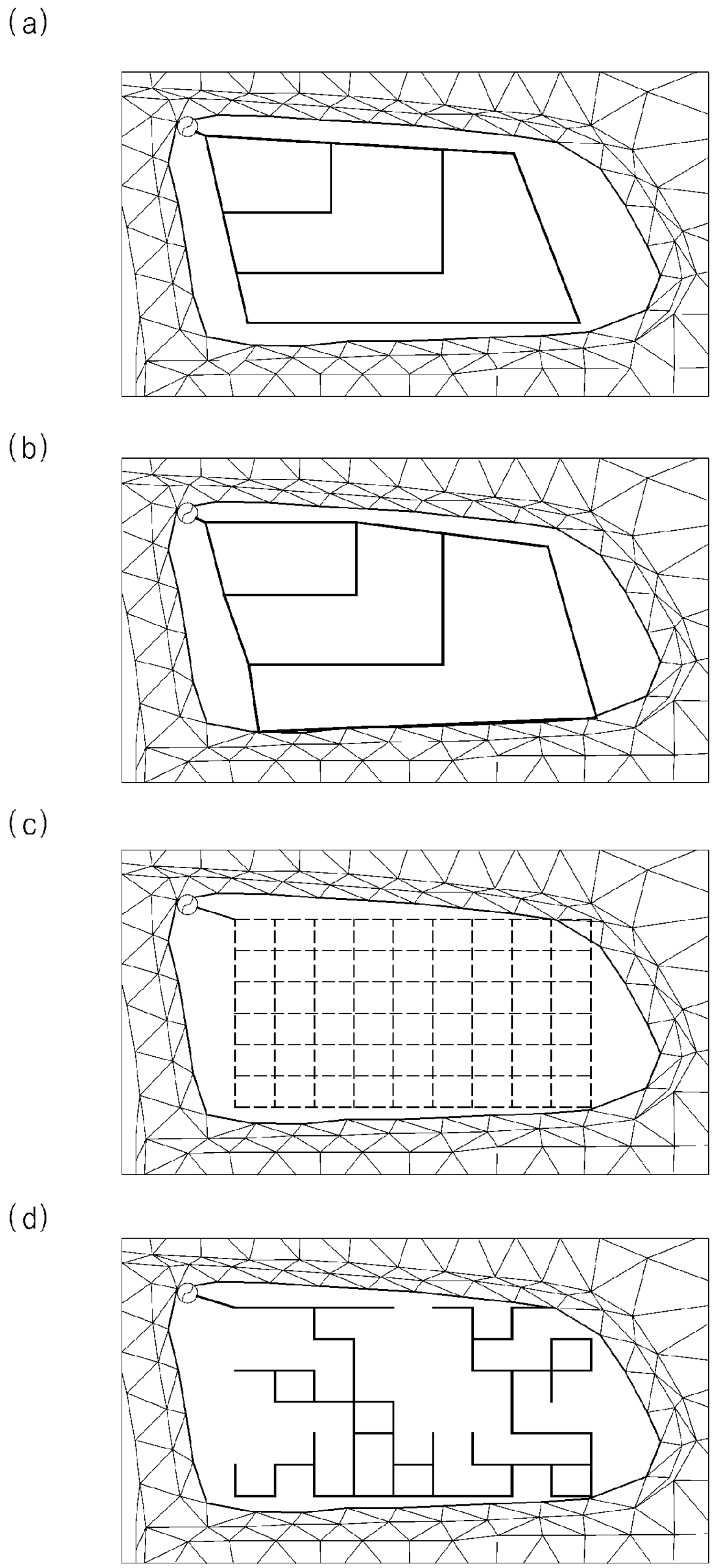
FIGS. 12(*a*), (*b*), (*c*), and (*d*) are conceptual diagrams showing a glass antenna design variable and an optimized glass antenna in a preferred glass antenna design method of the invention.

According to other further embodiments and as shown in FIG. 12, FIG. 12 is a conceptual diagram showing a glass antenna design variable and an optimized glass antenna in a preferred glass antenna design method of the invention.

In certain exemplary embodiments, for example as shown here, (a) shows a preferred design variable of glass antenna of a mufti-loop type, (b) shows an optimization result obtained by using the antenna length while determining each point of loop as a variable, (c) shows a preferred design variable of a glass antenna of Mesh-grid type, and (d) shows an optimization result obtained by using the creation of each strip line after determining the Mesh-grid type in adjustment to the glass size.

Figure 13:
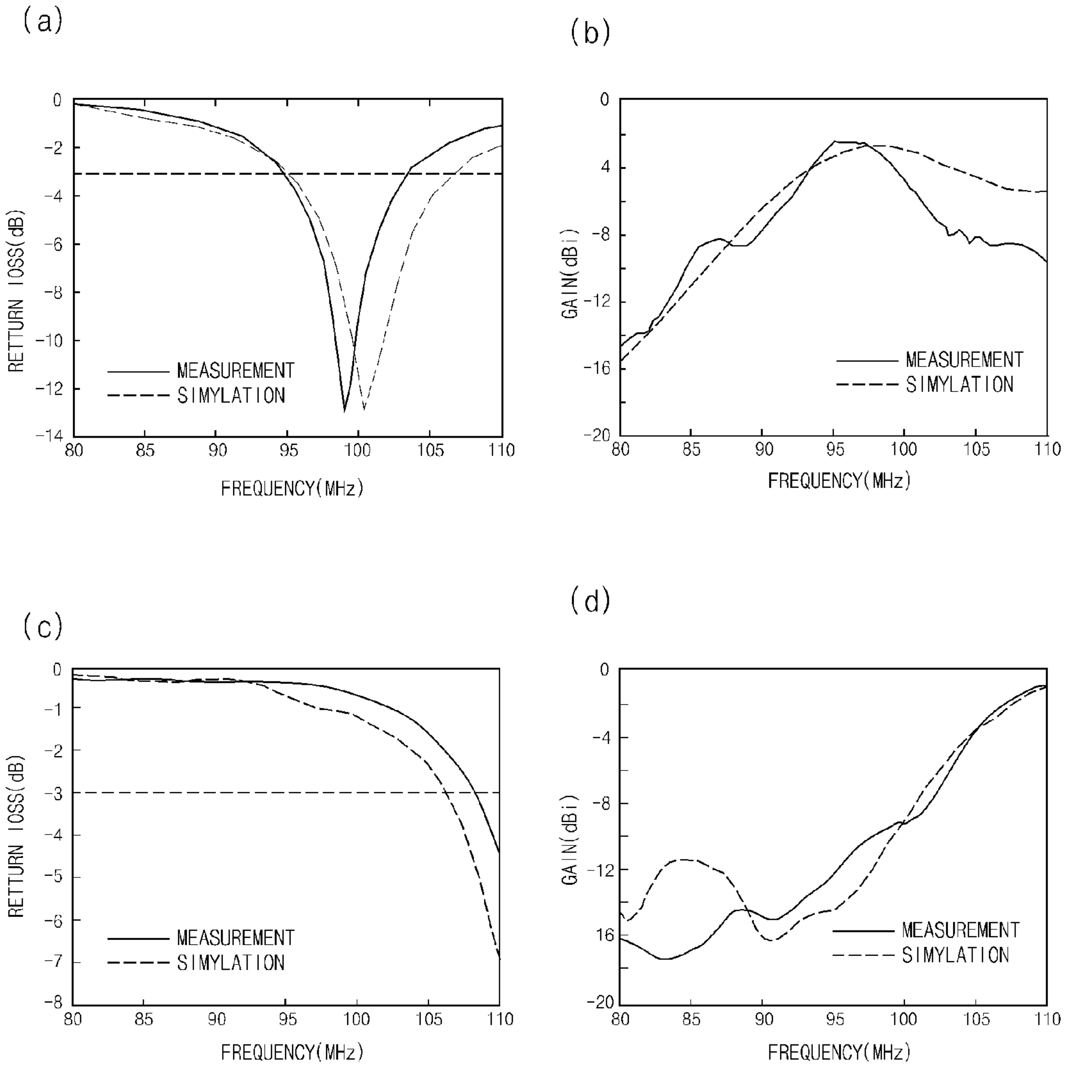
FIGS. 13(*a*), (*b*), (*c*), and (*d*) are graphs showing a reflection loss and a broadside direction radiation gain of an embodiment of a glass antenna optimized in a preferred glass antenna design method of the invention.

According to other further embodiments and as shown in FIG. 13, FIG. 13 is a graph showing a reflection loss and a broadside direction radiation gain of an embodiment of a glass antenna optimized in a glass antenna design method of the invention, (a) and (b) indicate a reflection loss and a broadside direction radiation gain of a mufti-loop type glass antenna, (c) and (d) indicate a reflection loss and an broadside direction radiation gain of Mesh-grid type.

Referring to FIG. 13, in the FM radio frequency band (80 MHz~110 MHz), the simulation of reflection loss and broadside direction radiation gain and the measurement are very similar, and the broadside direction radiation gain of the two kinds of antennas is a value which is higher than −20 dBi.

Preferably, the mufti-loop type glass antenna has a bandwidth of 95 MHz~103 MHz based on a reflection loss −3 dB, and indicates the radiation gain higher than −15 dBi in all frequencies. Further, the reflection loss of a glass antenna of Mesh-grid type is −3 dB or less in a high frequency bandwidth, while the broadside direction radiation gain is preferably a value higher than −15 dBi in 90 MHz~110 MHz band.

Figure 14:
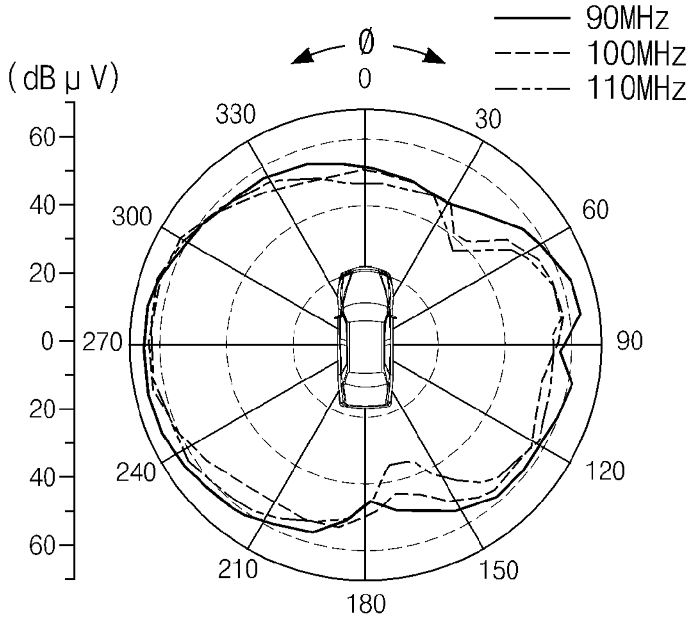
FIGS. 14(*a*) and (*b*) are graphs showing a measured value of a receive voltage of a glass antenna optimized in a preferred glass antenna design method of the invention.
Figure 14:
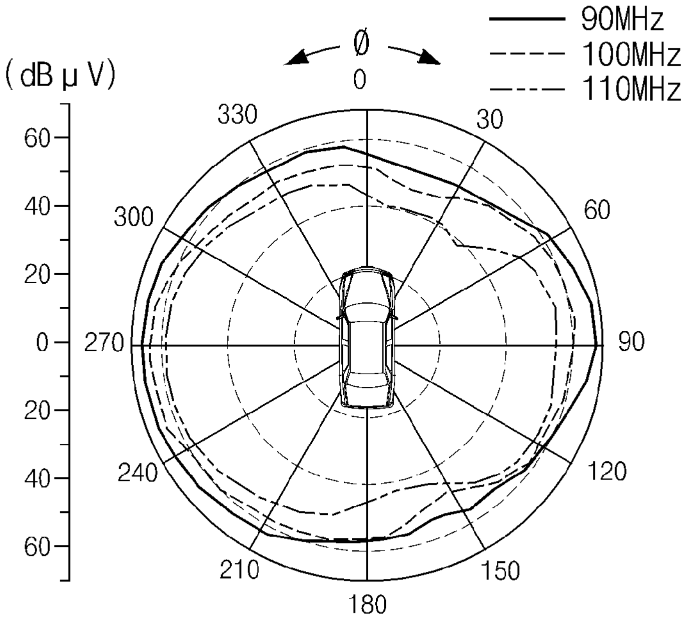

According to other further embodiments and as shown in FIG. 14, FIG. 14 is a graph showing a measured value of a receive voltage of a glass antenna suitably optimized in a glass antenna design method of the invention. FIG. 14 shows a result measured by a system transmitting 1 mW in a distance of 30 m by using a Yagi-Uda antenna in which a broadside direction gain is −2 dBi.

In certain exemplary embodiments and referring to FIG. 14, in 90 MHz, 100 MHz, 110 MHz corresponding to a FM frequency band, a similar receive voltage pattern is shown. The maximum value is about 60 dB μV in a direction (f=270°) that the antenna is mounted while a null signal indicates not much voltage generated at each frequency. According to further exemplary embodiment, and shown here, (a) indicates a receive voltage of glass antenna of multi-loop type, (b) indicates a receive voltage of glass antenna of Mesh-grid type.

Figure 15:
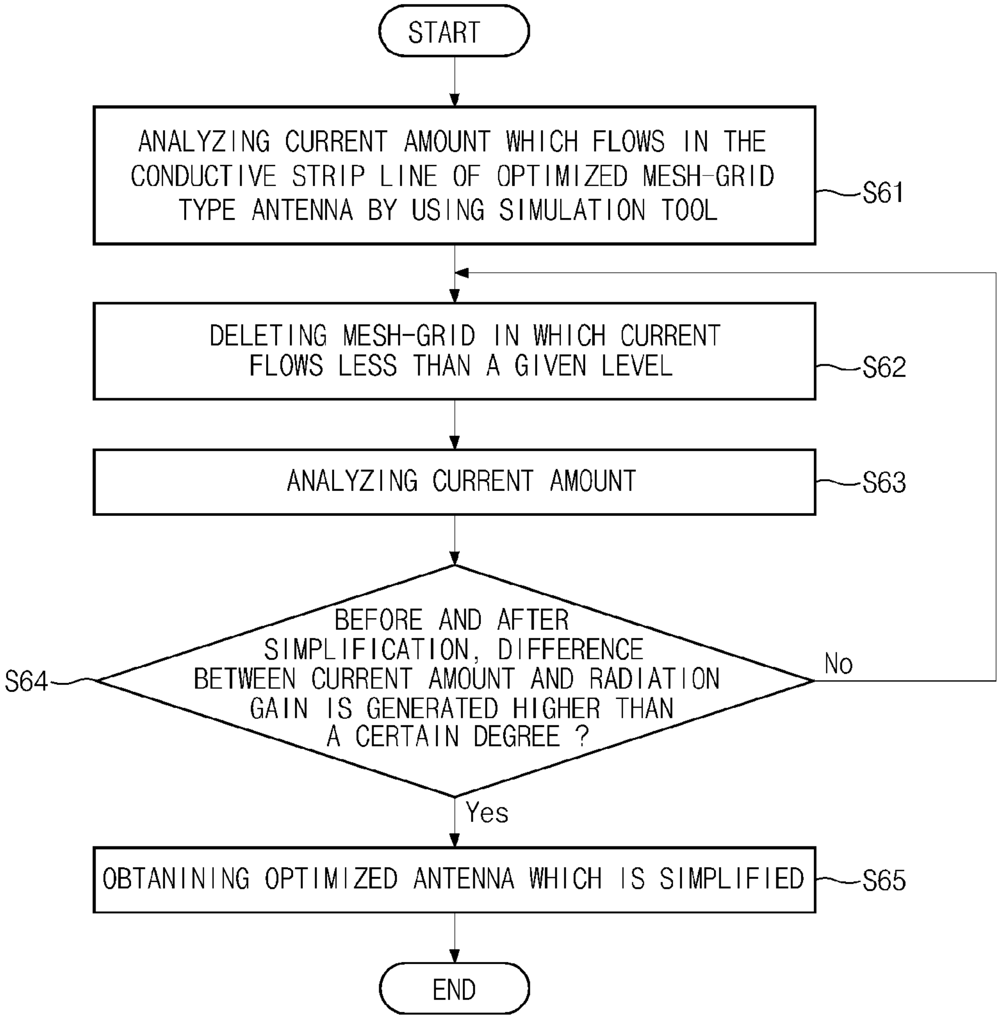
FIG. 15 is a flowchart showing a current amount based shape simplification technique in a preferred glass antenna design method of the invention.

According to other further embodiments and as shown in FIG. 15, FIG. 15 is a flowchart showing a current amount based shape simplification technique in a preferred glass antenna design method of the invention.

In certain exemplary embodiments and referring to FIG. 15, a current amount which flows in the conductive strip line of the optimized Mesh-grid type antenna is suitably analyzed by using a simulation tool (S61). Preferably, after deleting a mesh-grid in which current flows at a low level (S62), the current amount is suitably analyzed again (S63). According to further embodiments, before and after the simplification, by comparing the current amount of the antenna with the radiation gain (S64), the simplification process is preferably repeated when the difference is suitably lower than a certain degree, while obtaining an optimized antenna which is simplified after completing the current amount based shape simplification technique when the difference is suitably higher than a certain degree (S65).

Figure 16:
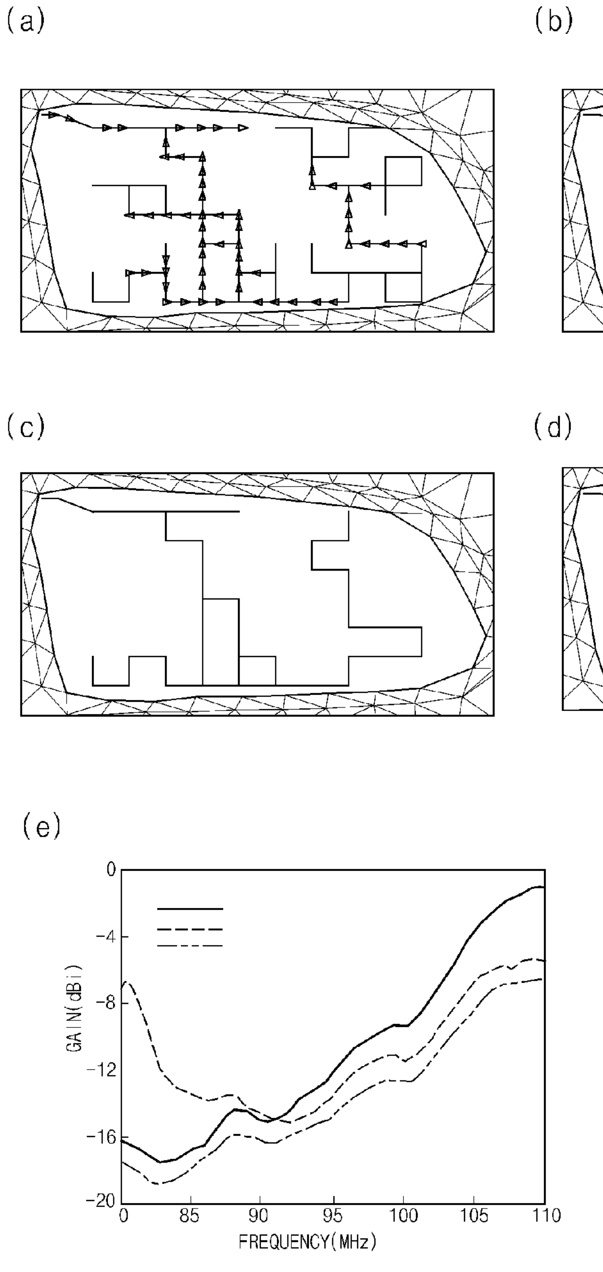
FIGS. 16(*a*), (*b*), (*c*), (*d*) and (*e*) are conceptual diagrams showing a simplification process of a glass antenna of a Mesh-grid type applying a current amount based shape simplification technique in a preferred glass antenna design method of the invention.

According to other further embodiments and as shown in FIG. 16, FIG. 16 is a conceptual diagram showing a preferred simplification process of a glass antenna of a Mesh-grid type, suitably applying a current amount based shape simplification technique in a preferred glass antenna design method of the invention.

According to exemplary embodiments and as described, for example, here, (a) indicates a current distribution of optimized Mesh-grid type antenna, (b) indicates a glass antenna pattern before a suitable simplification, (c) indicates a glass antenna pattern after a first suitable simplification, (d) indicates a glass antenna pattern after a second suitable simplification, and (e) is a graph that shows the comparison of glass antenna gain before and after a suitable simplification. In further exemplary embodiments and referring to FIG. 16, it shows the 100 MHz current distribution of glass antenna of Mesh-grid type while showing the antenna pattern before and after the simplification through a current amount based shape simplification technique and a broadside direction radiation gain measurement result.

In one preferred embodiment, the current amount which flows in each Mesh-grid type antenna line is suitably calculated and the current amount of a Mesh-grid line (Mesh-grid minimum current amount) in which the least current flows is confirmed. In further embodiments, after removing the mesh-grid structure in which a current higher than a certain current amount (Mesh-grid minimum current amount dBA+10 dBA) does not flow in each Mesh-grid structure line, the current amount and the radiation gain are suitably compared, and in further related embodiments, the result is obtained through two simplification processes. Preferably, even though the shape of an antenna is suitably simple, the gain difference of antenna radiation before and after the simplification is less than 5 dB, and it is in the frequency range of 80 MHz~110 MHz.

In further preferred embodiments, in order to reduce the time of glass antenna design optimization using the EM simulation tool, the present invention designates a plurality of computers as a master computer and a slave computer and in parallel connects such that the time required for the creation of one generation can be suitably shortened. As described above, the glass antenna design method using the EM simulation tool and the optimization algorithm is a method for efficiently designing a glass antenna having a desired performance regardless of the kind of vehicle and the glass size and shape.

Preferably, in the FM band glass antenna which is optimized by using the suggested glass antenna design method, the simulation of the reflection loss and broadside direction radiation gain is suitably similar to the measured value, thus the performance of antenna can be suitably predicted by utilizing the EM simulator. Accordingly, in preferred embodiments of the present invention, by using several shape simplification techniques, it can be optimized with an antenna shape which is suitable for mass production, such that a preferred design technique that is suitable for use at an industrial site, and in particular for immediate use at an industrial site. In further preferred embodiments of the present invention, the glass antenna design method can suitably optimize the antenna by differentiating an initial prototype, such that the glass antenna design can be applied to the glass antenna design for various broadcasts and communications.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for designing a glass antenna, the method for automatically designing a glass antenna by combining an EM simulation tool with an optimization algorithm, a preparation step of controlling an equivalence coding condition of a glass and a location of an antenna power feeding unit so that a simulation of a glass antenna can be possible through an EM (engineering model) simulator, changing a vehicle structure with a mesh number appropriate for applying an optimization algorithm, and determining a proper initial prototype according to a kind of vehicle and glass size and shape;

a performance optimization step of optimizing a glass antenna performance by operating the EM simulator with the optimization algorithm after the preparation step is completed; and a mass production optimization step of redesigning an optimized glass antenna as a final glass antenna shape applicable to a mass production when the optimized glass antenna is obtained after the performance optimization step is completed, wherein the performance optimization step comprises:

encoding and decoding the glass antenna shape of the initial prototype by utilizing the EM simulator;

filtering a design in which the glass antenna shape or a condition is not suitable;

determining cost values which are indexes indicating the performance of the glass antenna;

determining a Pareto-Cost value after the simulation of one generation is completed;

determining a convergence of the Pareto cost value; and creating a new generation and circulating to the decoding step in case the Pareto-Cost value does not converge, while obtaining the optimized glass antenna in case the Pareto cost value converges.

2. The method of claim 1, wherein the preparation step comprises:

adjusting the equivalence coding condition of the glass;

controlling the mesh number of the vehicle structure; and determining the initial prototype according to the vehicle and the glass.

3. The method of claim 2, wherein adjusting the equivalence coding condition comprises equalizing a strip line shape printed on the glass with a wire coding method.

4. The method of claim 2, wherein controlling the mesh number comprises analyzing a current induced to a car body by the glass antenna.

5. The method of claim 1, wherein encoding and decoding the glass antenna shape comprises assigning a binary bit by using a section length of the glass antenna or the existence of a strip line of mesh grid structure.

6. The method of claim 1, wherein filtering a design is performed by using a undesired shape filtering which is applied to the glass antenna design using the section length of antenna or by using a connection warranted filtering applied to the glass antenna design using a mesh grid type.

7. The method of claim 1, wherein the cost value sets up a desired performance of the glass antenna as an average of a reflection loss of a corresponding frequency or as an average of radiation gain difference at a broadside direction (θ=90°, f=270°).

8. The method of claim 1, wherein the optimization algorithm is selected from the group consisting of: a gene algorithm, a pareto gene algorithm, a micro gene algorithm, PSON (Particle Swarm Optimization), Newton-Raphson, and a neural algorithm.

9. The method of claim 1, wherein a vehicle power feeding unit and a glass power feeding unit are connected through a wire which is extended with a given length in a vertical direction respectively for the simulation of the EM simulator.

10. The method of claim 1, wherein the performance optimization step comprises designating a plurality of computers as a master computer and a slave computer and in parallel connecting them such that time required for one generation creation can be shortened, so as to reduce the time of glass antenna design optimization using the EM simulation tool.

11. The method of claim 1, wherein the mass production optimization step comprises obtaining a final glass antenna by using an antenna shape simplification technique so as to simplify the optimized glass antenna as a shape which is actually applicable to mass production.

12. The method of claim 11, wherein obtaining a final glass antenna comprises redesigning the final glass antenna as an antenna shape which is actually applicable to mass production by removing a strip line which has the problem of appearance as the optimized antenna shape is too complex and a strip line which exists in a location which cannot be actually applied in mass production through a current amount based antenna shape simplification technique which simplifies a shape of the optimized glass antenna based on a current amount.

13. The method of claim 12, wherein the current amount based antenna shape simplification technique simplifies a shape of a glass antenna by analyzing a density of the current which flows in a conductive strip line of a glass antenna structure for each frequency by using the simulation tool, and removing the strip line in which the current amount flows less than a certain degree.

14. The method of claim 11, wherein obtaining a final glass antenna comprises redesigning the final glass antenna as an antenna shape which is actually applicable to mass production by using a control technique of strip line width and length, which keeps a width of a major strip line to maintain a given thickness in case the major strip line affects antenna performance over a given degree while keeping a width of a strip line to be thin in case the strip line affects antenna performance less than a given degree by analyzing a principle of operation according to a shape of each antenna.

* * * * *